(12) United States Patent
Palazzolo

(10) Patent No.: US 9,473,319 B2
(45) Date of Patent: Oct. 18, 2016

(54) DYNAMIC DISCOVERY AND ASSIGNMENT OF AVAILABLE VIRTUAL LOCAL AREA NETWORKS

(71) Applicant: International Business Machines Corporation, Armonk, NY (US)

(72) Inventor: Aaron S. Palazzolo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/277,138

(22) Filed: May 14, 2014

(65) Prior Publication Data

US 2015/0333927 A1    Nov. 19, 2015

(51) Int. Cl.
| | |
|---|---|
| *H04L 12/54* | (2013.01) |
| *H04L 12/24* | (2006.01) |
| *H04L 12/46* | (2006.01) |
| *H04L 12/947* | (2013.01) |
| *H04L 12/64* | (2006.01) |

(52) U.S. Cl.
CPC ........... *H04L 12/24* (2013.01); *H04L 12/4641* (2013.01); *H04L 12/4675* (2013.01); *H04L 12/6418* (2013.01); *H04L 41/00* (2013.01); *H04L 41/0803* (2013.01); *H04L 49/25* (2013.01)

(58) Field of Classification Search
CPC ............... H04L 12/46; H04L 12/4641; H04L 12/4675; H04L 41/08; H04L 41/0803; H04L 49/25; H04L 12/4679; H04L 49/00
USPC ......................................... 370/352, 392, 401
See application file for complete search history.

(56) References Cited

U.S. PATENT DOCUMENTS

| | | | |
|---|---|---|---|
| 2005/0044271 A1 | 2/2005 | Bastide et al. | |
| 2007/0097972 A1* | 5/2007 | Jain ..................... | H04L 12/4641 370/392 |
| 2008/0239957 A1* | 10/2008 | Tokura et al. ................ 370/235 | |

(Continued)

FOREIGN PATENT DOCUMENTS

| | | |
|---|---|---|
| CN | 101106512 A | 1/2008 |
| CN | 101106512 B | 7/2010 |

(Continued)

OTHER PUBLICATIONS

Gude et al., "NOX: Towards an Operating System for Networks", ACM SIGCOMM Computer Communication Review 38, No. 3 (2008), pp. 105-110, provided by searcher Thien Tran on Feb. 27, 2014.

(Continued)

*Primary Examiner* — Anh Ngoc Nguyen
*Assistant Examiner* — Syed M Bokhari
(74) *Attorney, Agent, or Firm* — Edward P. Li

(57) ABSTRACT

An approach for dynamic discovery and assignment of virtual local area networks (VLANs) is provided. In the approach, a network switch receives a request for VLAN configuration, from a device connecting to a port of the network switch. The network switch retrieves a list of available VLANs at the port, determines whether respective ones of the available VLANs are configured for the device, forms an acknowledgement including a list of VLANs configured for the device, and sends the acknowledgement to the device. In the approach, the acknowledgement is used to determine one of the VLANs configured for the device; the one of the VLANs configured for the device is tagged by the device to an adapter of the device, and the device is connected to the one of the VLANs configured for the device.

18 Claims, 4 Drawing Sheets

(56) References Cited

U.S. PATENT DOCUMENTS

| | | |
|---|---|---|
| 2009/0141717 A1 | 6/2009 | Cabeca et al. |
| 2010/0293250 A1 | 11/2010 | Ankaiah et al. |
| 2011/0200037 A1* | 8/2011 | See et al. ............... 370/352 |
| 2011/0238793 A1 | 9/2011 | Bedare et al. |
| 2012/0023207 A1 | 1/2012 | Gandhewar et al. |
| 2013/0346564 A1 | 12/2013 | Warrick et al. |

FOREIGN PATENT DOCUMENTS

| | | |
|---|---|---|
| CN | 102130890 A | 7/2011 |
| CN | 102130890 B | 9/2013 |
| EP | 1713197 A1 | 10/2006 |
| EP | 1826957 A1 | 8/2007 |

OTHER PUBLICATIONS

Kiravuo et al., "A Survey of Ethernet LAN Security", IEEE Communications Surveys & Tutorials, vol. 15, No. 3, Third Quarter 2013, pp. 1477-1491, © 2013 IEEE.

Mariën A., "Internet Infrastructure K.U. Leuven 2009-2010 Part 1: Networking", © 2004 André Mariën, provided by searcher Thien Tran on Feb. 27, 2014.

* cited by examiner ns known in the art. DHCP is a standardized networking protocol used on Internet Protocol (IP) networks for dynamically distributing network configuration parameters, such as IP addresses for interfaces and services.

DYNAMIC DISCOVERY AND ASSIGNMENT OF AVAILABLE VIRTUAL LOCAL AREA NETWORKS

TECHNICAL FIELD OF THE INVENTION

The present invention relates generally to virtual local area networks (VLANs), and more particularly to dynamic discovery and assignment of VLANs.

BACKGROUND

Network configuration was made easier in 1993 when DHCP (Dynamic Host Configuration Protocol) was introduced. DHCP is a standardized networking protocol used on Internet Protocol (IP) networks for dynamically distributing network configuration parameters, such as IP addresses for interfaces and services. DHCP allows dynamic host configuration and assignment of IPs to network devices. However, there exists the challenge of network configuration in an environment of a virtual local area network (VLAN). Although network switches know exactly what VLANs are defined per port, the devices connecting to switch ports do not without external assistance (such as, user intervention or in-depth coding). When a device is attached to one of these switch ports, it will have no access to the network unless a VLAN is manually configured. Connectivity only occurs once the VLAN is tagged. VLAN tagging of switch ports often creates configuration headaches for devices. All VLAN tagging is currently being performed on devices with user knowledge of the network characteristics of the attached switch ports. There are no functionalities in place today for automating this configuration.

SUMMARY

In one aspect, a method for dynamic discovery and assignment of virtual local area networks (VLANs) is provided. The method implemented by a network switch comprises: receiving a request for VLAN configuration, from a device connecting to a port of the network switch; retrieving a list of available VLANs at the port; determining whether respective ones of the available VLANs are configured for the device; forming an acknowledgement to the request, the acknowledgement comprising a list of VLANs configured for the device; and sending the acknowledgement to the device. In the method, the acknowledgement is used to determine one of the VLANs configured for the device; the one of the VLANs configured for the device is tagged by the device to an adapter of the device, and the device is connected to the one of the VLANs configured for the device.

In another aspect, a computer program product for dynamic discovery and assignment of virtual local area networks (VLANs) is provided. The computer program product comprises a computer readable storage medium having program code embodied therewith. The program code is executable to receive, by a network switch, a request for VLAN configuration from a device connecting to a port of the network switch. The program code is executable to retrieve, by the network switch, a list of available VLANs at the port. The program code is executable to determine, by the network switch, whether respective ones of the available VLANs are configured for the device. The program code is executable to form, by the network switch, an acknowledgement to the request, wherein the acknowledgement comprises a list of VLANs configured for the device. The program code is executable to send, by the network switch, the acknowledgement to the device. In the computer program product, the acknowledgement is used to determine one of the VLANs configured for the device; the one of the VLANs configured for the device is tagged by the device to an adapter of the device, and the device is connected to the one of the VLANs configured for the device.

In yet another aspect, a computer system for dynamic discovery and assignment of virtual local area networks (VLANs) is provided. The computer system comprises one or more processors, one or more computer-readable tangible storage devices, and program instructions stored on at least one of the one or more computer-readable tangible storage devices for execution by at least one of the one or more processors. The program instructions are executable to receive, by a network switch, a request for VLAN configuration from a device connecting to a port of the network switch. The program instructions are executable to retrieve, by the network switch, a list of available VLANs at the port. The program instructions are executable to determine, by the network switch, whether respective ones of the available VLANs are configured for the device. The program instructions are executable to form, by the network switch, an acknowledgement to the request, wherein the acknowledgement comprises a list of VLANs configured for the device. The program instructions are executable to send, by the network switch, the acknowledgement to the device. In the computer system, the acknowledgement is used to determine one of the VLANs configured for the device; the one of the VLANs configured for the device is tagged by the device to an adapter of the device, and the device is connected to the one of the VLANs configured for the device.

DETAILED DESCRIPTION

Embodiments of the present invention disclose a solution to ease device configuration in a network environment containing varying VLANs per switch port. This invention takes the most basic concepts of DHCP and applies them to VLAN tagging so that a switch can communicate with a device and give it a list of VLANs available. In the present invention, any VLAN shown as available by the switch can be automatically tagged to the associated adapter ports on the connected device, thus allowing network connectivity with little to no user intervention.

Figure 1:
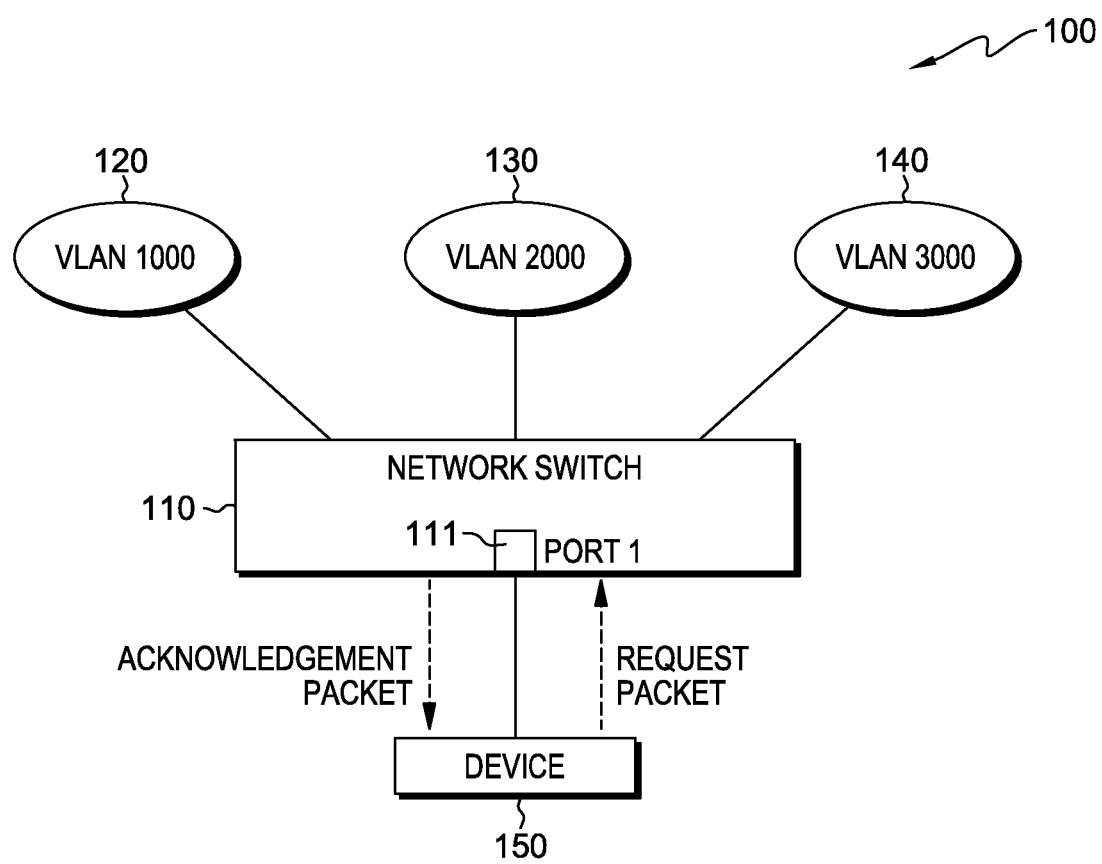
FIG. 1 is a diagram illustrating a network system in which a device is connected to virtual local area networks (VLANs) through a network switch, in accordance with one embodiment of the present invention.

FIG. 1 is a diagram illustrating system 100 in which device 150 is connected, through network switch 110, to virtual local area networks VLAN 1000 120, VLAN 2000 130, and VLAN 3000 140, in accordance with one embodiment of the present invention. Network switch 110 is a computer networking device that is used to connect devices together on a computer network by performing a form of packet switching. Device 150 is a computer device or any other electronic device or computing system capable of receiving input from a user, executing computer program instructions, and communicating with another computing system through networks. Device 150 is connected to port 1 111 on network switch 110. Port 1 111 contains a list of all VLANs available on the port 1, and a list of VLANs available to device 150. In the embodiment, port 1 111 is configured to allow access to VLAN 1000 120, VLAN 2000 130, and VLAN 3000 140. In the embodiment, at least one of VLAN 1000 120, VLAN 2000 130, and VLAN 3000 140 is available for device 150. Device 150 sends to network switch 110 a request packet for VLAN configuration, requesting for VLANs available on port 1 111. The request packet sent from device 150 includes, for example, MAC (Media Access Control) address of device 150 and a request for all VLANs available on port 1 111 of network switch 110. In response to receiving the request packet, network switch 110 replies with an acknowledgement packet. The acknowledgement packet sent to device 150 includes, for example, the switch port number and a list of available VLANs configured for device 150. Device 150 receives the acknowledgement packet and understands how to achieve network connectivity to VLAN 1000 120, VLAN 2000 130, and/or VLAN 3000 140. If multiple VLANs are presented to device 150, a user or automation will be needed to decide which is best to use. In system 100, not all VLANs configured on port 1 111 may be presented to device 150 during this request. This allows for keeping some specific VLANs hidden from this automated process. Once device 150 determines one or more of VLAN 1000 120, VLAN 2000 130, and VLAN 3000 140 to be used, the device tags the one or more of VLAN 1000 120, VLAN 2000 130, and VLAN 3000 140 to an adapter of the device. Thus, device 150 connects to VLAN 1000 120, VLAN 2000 130, and/or VLAN 3000 140.

Figure 2:
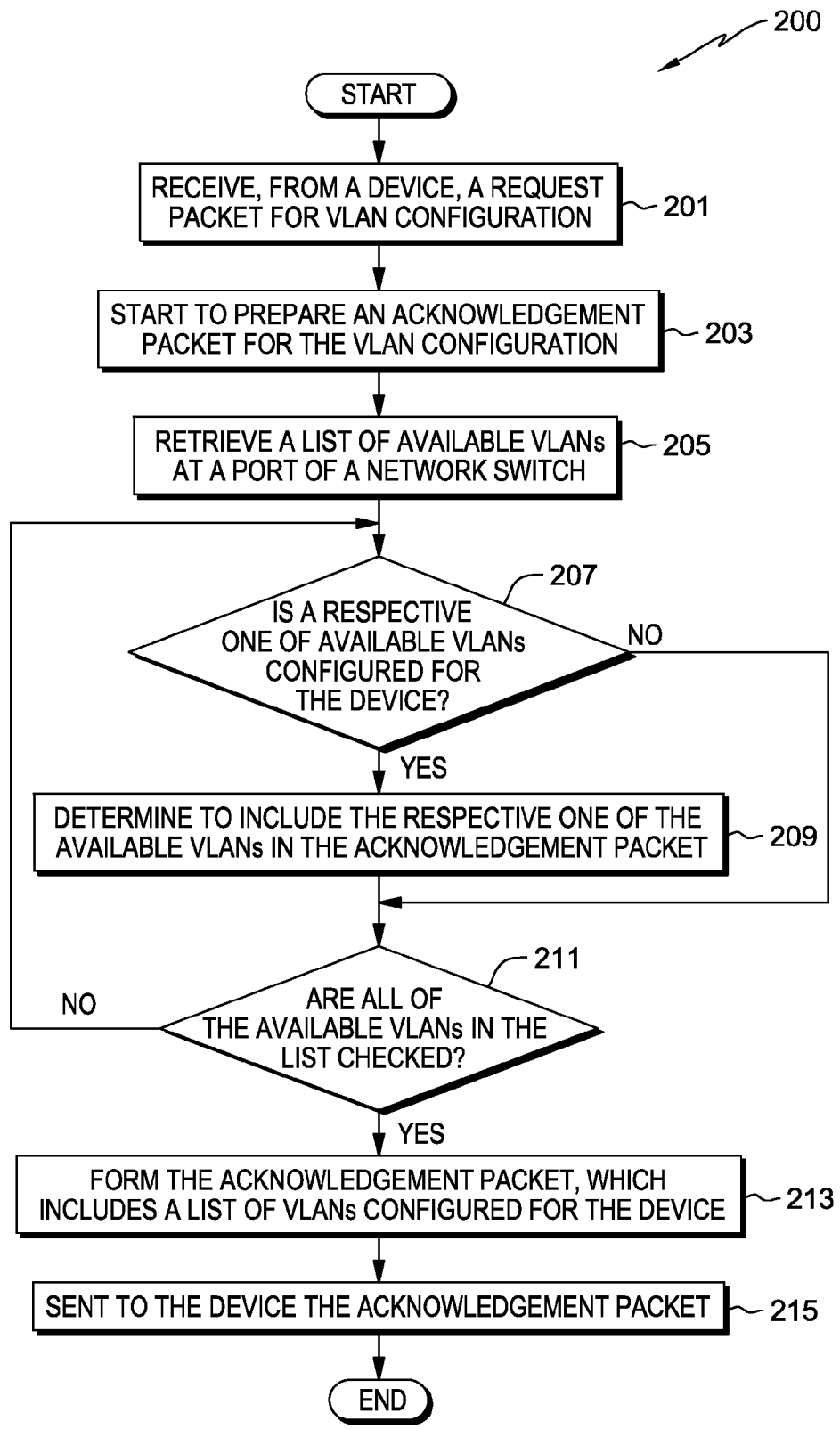
FIG. 2 is a flowchart illustrating operating steps for a network switch to respond to a request packet from a device for VLAN configuration, in accordance with one embodiment of the present invention.

FIG. 2 is flowchart 200 illustrating operating steps for network switch 110 to respond to a request packet from device 150 for VLAN configuration, in accordance with one embodiment of the present invention. The steps are implemented by one or more computer programs embodied within the computer readable storage medium on network switch 110.

At step 201, network switch 110 receives, from device 150, a request packet for VLAN configuration. In the embodiment, the request packet includes MAC (Media Access Control) address of device 150 and a request for all VLANs available on port 1 111 of network switch 110. At step 203, network switch 110 starts to prepare an acknowledgement packet for VLAN configuration. The acknowledge packet is prepared for responding to the request packet. In the embodiment, the acknowledge packet is to be sent to device 150, and it includes the switch port number of port 1 111 and a list of available VLANs configured for device 150.

At step 205, network switch 110 retrieves a list of all available VLANs at port 1 111 of network switch 110. At decision block 207, network switch 110 determines whether a respective one of the available VLANs at port 1 111 is configured for device 150. In response to determining that the respective one of the available VLANs at port 1 111 is not configured for device 150 ("NO" branch of decision block 207), network switch 110 does not include the respective one of the available VLANs in the acknowledgement packet. Thus, network switch 110 checks a next one in the list of all available VLANs at port 1 111; at decision block 211, network switch 110 determines whether all of the available VLANs in the list are checked.

In response to determining that the respective one of the available VLANs at port 1 111 is configured for device 150 ("YES" branch of decision block 207), at step 209, network switch 110 determines to include the respective one of the available VLANs in the acknowledgement packet. Then, network switch 110 processes decision block 211.

In response to determining that not all of the available VLANs in the list are checked ("NO" branch of decision block 211), network switch 110 checks a next one in the list of all available VLANs at port 1 111 and therefore reiterates decision block 207.

In response to determining that all of the available VLANs in the list are checked ("YES" branch of decision block 211), network switch 110 at step 213 forms the acknowledgement packet. The acknowledgement packet includes a list of VLANs configured for device 150. At step 215, network switch 110 sends the acknowledgement packet to device 150.

Figure 3:
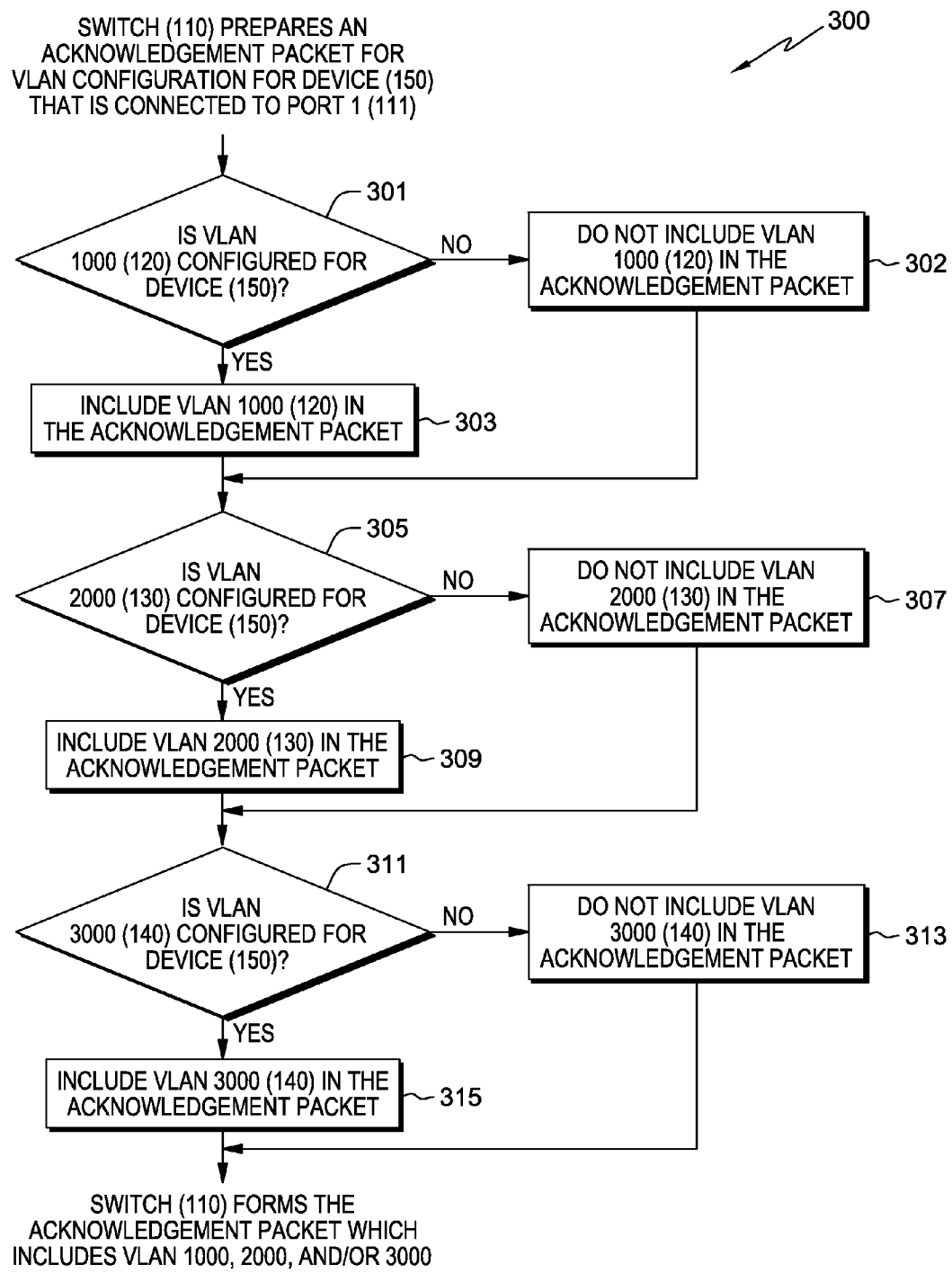
FIG. 3 is a flowchart illustrating operating steps for formation of an acknowledgement packet in the exemplary system shown in FIG. 1, in accordance with one embodiment of the present invention.

FIG. 3 is flowchart 300 illustrating operating steps for formation of an acknowledgement packet in the exemplary system shown in FIG. 1, in accordance with one embodiment of the present invention. The steps are implemented by one or more commuter programs embodied within the computer readable storage medium on network switch 110.

Referring to FIG. 3, when network switch 110 starts to prepare an acknowledgement packet for device 150 which is connected to port 1 111, network switch 110 at decision block 301 determines whether VLAN 1000 120 is configured for device 150. In response to determining that VLAN 1000 120 is configured for device 150 ("YES" branch of decision block 301), network switch 110 at step 303 includes VLAN 1000 120 in the acknowledgement packet. In response to determining that VLAN 1000 120 is not configured for device 150 ("NO" branch of decision block 301), network switch 110 at step 302 does not include VLAN 1000 120 in the acknowledgement packet.

After step 302 or 303, network switch 110 at decision block 305 determines whether VLAN 2000 130 is configured for device 150. In response to determining that VLAN 2000 130 is configured for device 150 ("YES" branch of decision block 305), network switch 110 at step 309 includes VLAN 2000 130 in the acknowledgement packet. In response to determining that VLAN 2000 130 is not configured for device 150 ("NO" branch of decision block 305), network switch 110 at step 307 does not include VLAN 2000 130 in the acknowledgement packet.

After step 307 or 309, network switch 110 at decision block 311 determines whether VLAN 3000 140 is configured for device 150. In response to determining that VLAN 3000 140 is configured for device 150 ("YES" branch of decision block 311), network switch 110 at step 315 includes VLAN 3000 140 in the acknowledgement packet. In response to determining that VLAN 3000 140 is not configured for device 150 ("NO" branch of decision block 311), network switch 110 at step 313 does not include VLAN 2000 130 in the acknowledgement packet. After step 315, network switch 110 forms the acknowledgement packet which includes one or more of VLAN 1000 120, VLAN 2000 130, and VLAN 3000 140.

Figure 4:
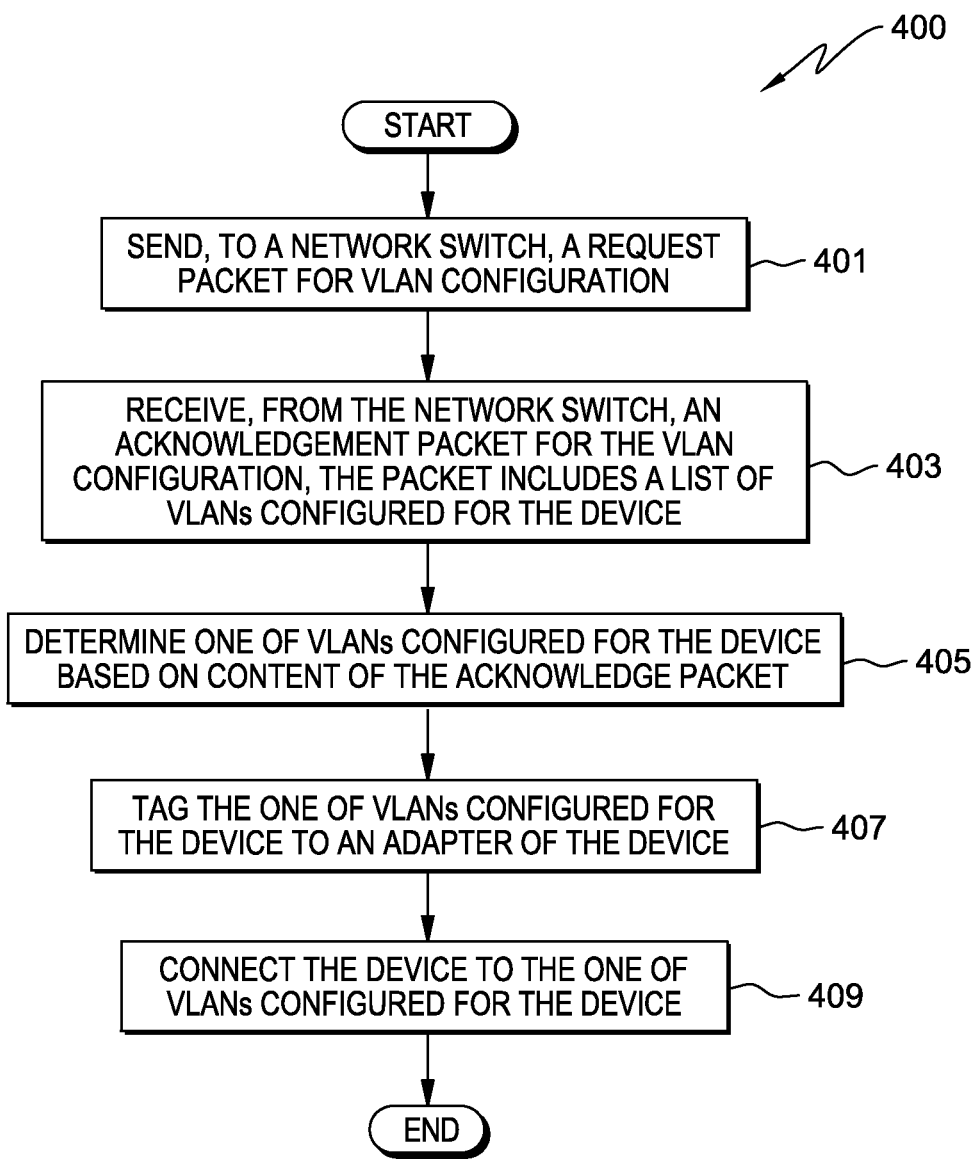
FIG. 4 is a flowchart illustrating operating steps for a device, which is connected to a network switch, to establish connectivity to a VLAN, in accordance with one embodiment of the present invention.

FIG. 4 is flowchart 400 illustrating operating steps for device 150, which is connected to network switch 110, to establish connectivity to one or more of VLAN 1000 120, VLAN 2000 130, and VLAN 3000 140, in accordance with one embodiment of the present invention. The steps are implemented by one or more commuter programs embodied within the computer readable storage medium on device 150.

At step 401, device 150 sends to network switch 110 a request packet for VLAN configuration. In the embodiment, the request packet includes MAC (Media Access Control) address of device 150 and a request for all VLANs available on port 1 111 of network switch 110. Upon receiving the request packet, network switch 110 prepares an acknowledgement packet, and then sends the acknowledgement packet back to device 150. At step 403, device 150 receives from network switch 110 the acknowledgement packet. In the embodiment, the acknowledgement packet includes the switch port number of port 1 111 of network switch 110 and a list of available VLANs configured for device 150.

At step 405, device 150 determines one of VLANs configured for the device 150, based on content of the acknowledgement packet. The one of VLANs configured for the device 150 is chosen from the list of the available VLANs configured for device 150; the list is included in the acknowledgement packet. At step 407, device 150 tags the one of VLANs configured for the device 150 to an adapter of device 150. The adapter is an Ethernet card on device 150. At step 409, device 150 connects to the one of VLANs configured for the device 150. In the embodiment, device 150 connected to port 1 111 of network switch 110, and now has full network connection to one of VLAN 1000 120, VLAN 2000 130, and VLAN 3000 140.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for dynamic discovery and assignment of virtual local area networks (VLANs), the method comprising:

receiving, by a network switch, a request for a VLAN configuration, from a computer device connecting to a port of the network switch;

retrieving, by the network switch, a list of available VLANs at the port;

determining, by the network switch, whether respective ones of the available VLANs are configured for the computer device;

determining, by the network switch, to include the respective ones of the available VLANs in an acknowledgement, in response to determining that the respective ones of the available VLANs are configured for the computer device;

forming, by the network switch, the acknowledgement to the request, the acknowledgement comprising a list of VLANs configured for the computer device, in response to determining that the respective ones of the available VLANs are not configured for the computer device and in response to determining that the respective ones of the available VLANs are checked;

sending, by the network switch, the acknowledgement to the computer device;

wherein the acknowledgement is used to determine one of the VLANs configured for the computer device, the one of the VLANs configured for the computer device is tagged by the computer device to an adapter of the computer device, and the computer device is connected to the one of the VLANs configured for the computer device; and wherein the computer device is connected to the port of the network switch, the port of the network switch is configured to allow access to the VLANs, and the port of the network switch contains the list of the available VLANs at the port.

2. The method of claim 1, further comprising:

sending, by the computer device, the request for the VLAN configuration to the network switch;

receiving, by the computer device, the acknowledgement from the network switch;

determining, by the computer device, the one of the VLANs configured for the computer device;

tagging, by the computer device, the one of the VLANs configured for the computer device to the adapter of the computer device; and connecting, by the computer device, to the one of the VLANs configured for the computer device.

3. The method of claim 1, wherein the computer device is a computer system capable of executing computer program instructions and communicating with another computer system through a network.

4. The method of claim 1, wherein the request comprises a media access control (MAC) address of the computer device and a request for the list of the available VLANs at the port.

5. The method of claim 1, wherein the acknowledgement further comprises a number of the port.

6. The method of claim 1, wherein a user determines the one of the VLANs configured for the computer device.

7. A computer program product for dynamic discovery and assignment of virtual local area networks (VLANs), the computer program product comprising a computer readable hardware storage device having program code embodied therewith, the program code executable to:

receive, by a network switch, a request for a VLAN configuration, from a computer device connecting to a port of the network switch;

retrieve, by the network switch, a list of available VLANs at the port;

determine, by the network switch, whether respective ones of the available VLANs are configured for the computer device;

determine, by the network switch, to include the respective ones of the available VLANs in an acknowledgement, in response to determining that the respective ones of the available VLANs are configured for the computer device;

form, by the network switch, the acknowledgement to the request, the acknowledgement comprising a list of VLANs configured for the computer device, in response to determining that the respective ones of the available VLANs are not configured for the computer device and in response to determining that the respective ones of the available VLANs are checked;

send, by the network switch, the acknowledgement to the computer device;

wherein the acknowledgement is used to determine one of the VLANs configured for the computer device, the one of the VLANs configured for the computer device is tagged by the computer device to an adapter of the computer device, and the computer device is connected to the one of the VLANs configured for the computer device; and wherein the computer device is connected to the port of the network switch, the port of the network switch is configured to allow access to the VLANs, and the port of the network switch contains the list of the available VLANs at the port.

8. The computer program product of claim 7, wherein the program code is further executable to:

send, by the computer device, the request for VLAN configuration to the network switch;

receive, by the computer device, the acknowledgement from the network switch;

determine, by the computer device, the one of the VLANs configured for the computer device;

tag, by the computer device, the one of the VLANs configured for the computer device to the adapter of the computer device; and connect, by the computer device, to the one of the VLANs configured for the computer device.

9. The computer program product of claim 7, wherein the computer device is a computer system capable of executing computer program instructions and communicating with another computer system through a network.

10. The computer program product of claim 7, wherein the request comprises a media access control (MAC) address of the computer device and a request for the list of the available VLANs at the port.

11. The computer program product of claim 7, wherein the acknowledgement further comprises a number of the port.

12. The computer program product of claim 7, wherein a user determines the one of the VLANs configured for the computer device.

13. A computer system for dynamic discovery and assignment of virtual local area networks (VLANs), the computer system comprising:

one or more processors, one or more computer-readable hardware storage devices, and program instructions stored on at least one of the one or more computer-readable hardware storage devices for execution by at least one of the one or more processors, the program instructions executable to:

receive, by a network switch, a request for a VLAN configuration, from a computer device connecting to a port of the network switch;

retrieve, by the network switch, a list of available VLANs at the port;

determine, by the network switch, whether respective ones of the available VLANs are configured for the computer device;

determine, by the network switch, to include the respective ones of the available VLANs in an acknowledgement, in response to determining that the respective ones of the available VLANs are configured for the computer device;

form, by the network switch, the acknowledgement to the request, the acknowledgement comprising a list of VLANs configured for the computer device in response to determining that the respective ones of the available VLANs are not configured for the computer device and in response to determining that the respective ones of the available VLANs are checked;

send, by the network switch, the acknowledgement to the computer device;

wherein the acknowledgement is used to determine one of the VLANs configured for the computer device, the one of the VLANs configured for the computer device is tagged by the computer device to an adapter of the computer device, and the computer device is connected to the one of the VLANs configured for the computer device; and wherein the computer device is connected to the port of the network switch, the port of the network switch is configured to allow access to the VLANs, and the port of the network switch contains the list of the available VLANs at the port.

14. The computer system of claim 13, wherein the program instructions are further executable to:

send, by the computer device, the request for VLAN configuration to the network switch;

receive, by the computer device, the acknowledgement from the network switch;

determine, by the computer device, the one of the VLANs configured for the computer device;

tag, by the computer device, the one of the VLANs configured for the computer device to the adapter of the computer device; and connect, by the computer device, to the one of the VLANs configured for the computer device.

15. The computer system of claim 13, wherein the computer device is a computer system capable of executing computer program instructions and communicating with another computer system through a network.

16. The computer system of claim 13, wherein the request comprises a media access control (MAC) address of the computer device and a request for the list of the available VLANs at the port.

17. The computer system of claim 13, wherein the acknowledgement further comprises a number of the port.

18. The computer system of claim 13, wherein a user determines the one of the VLANs configured for the computer device.

* * * * *